June 21, 1938.  F. M. SMALL  2,121,213
INTERIOR PANELING
Filed March 29, 1934   9 Sheets-Sheet 1

Inventor
Frederick M. Small
By Bacon & Thomas
Attorneys

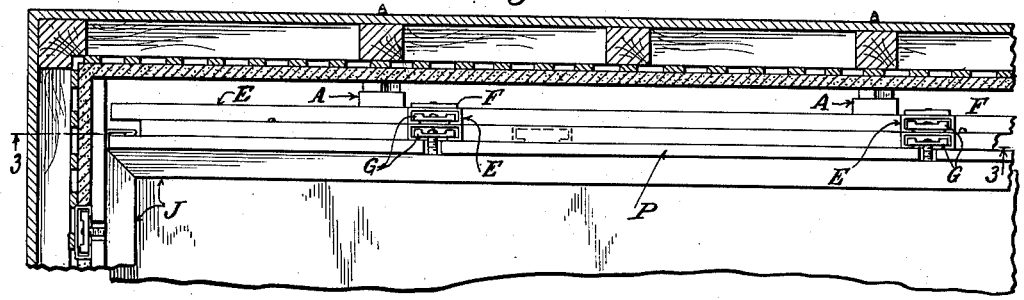
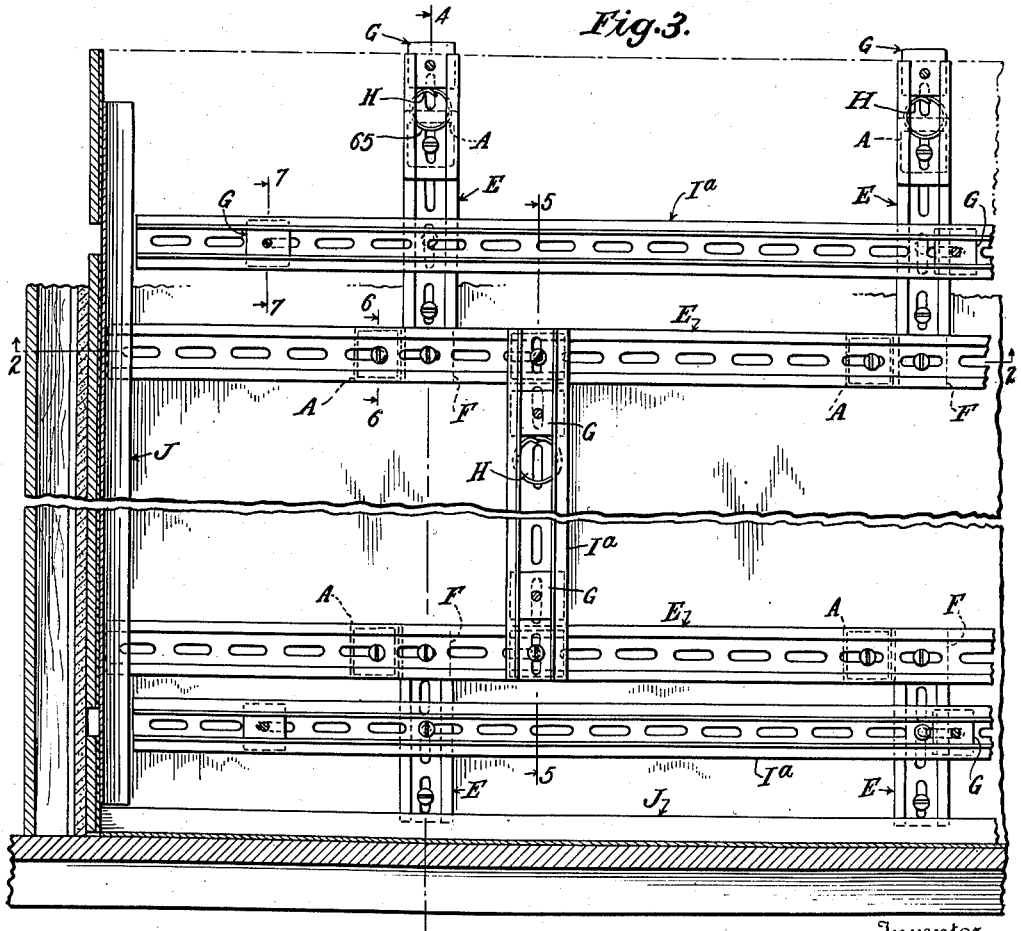

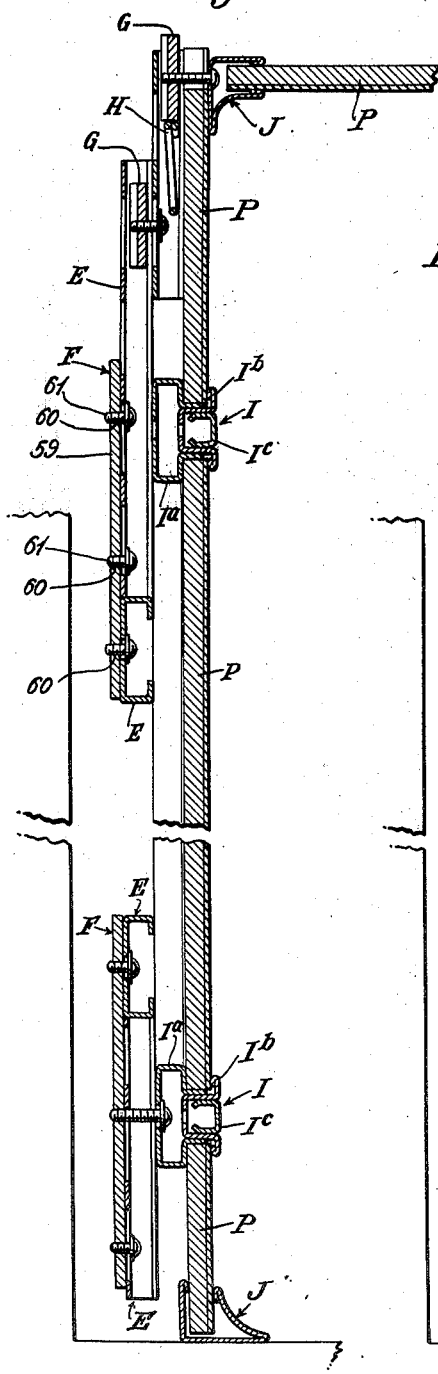
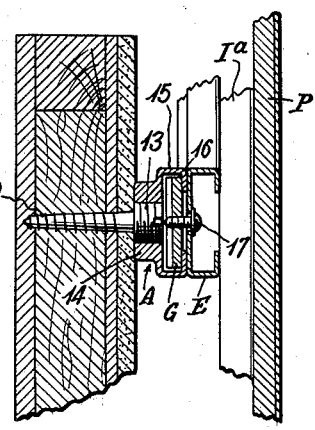
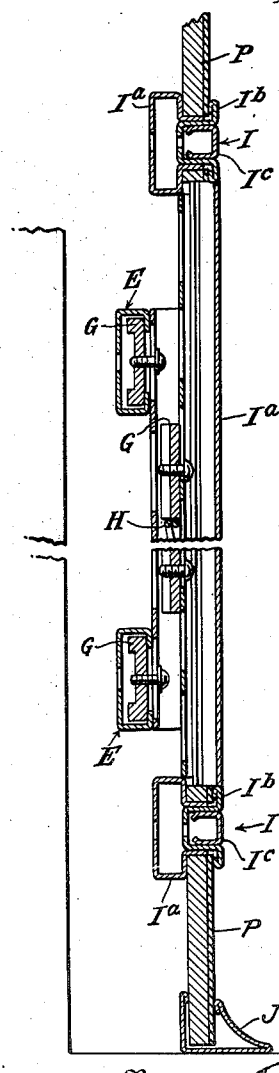
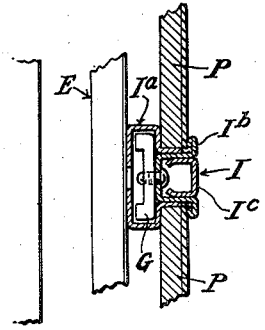

June 21, 1938.  F. M. SMALL  2,121,213
INTERIOR PANELING
Filed March 29, 1934    9 Sheets-Sheet 4

Inventor
Frederick M. Small
By Bacon & Thomas
Attorneys

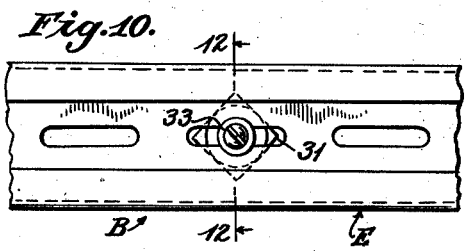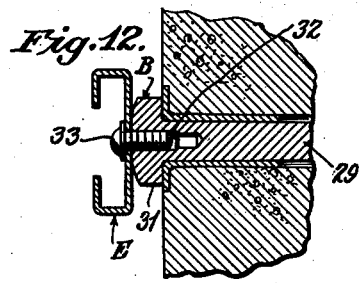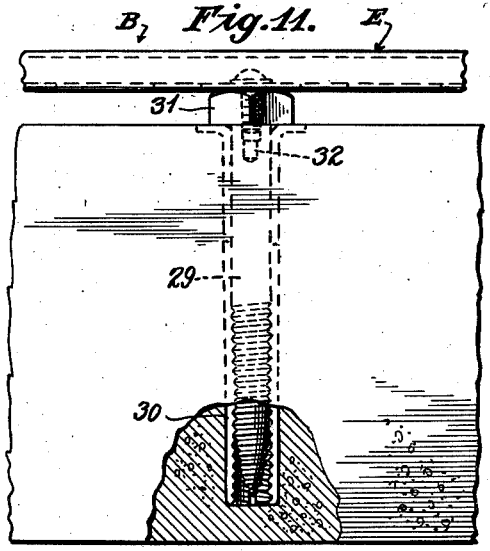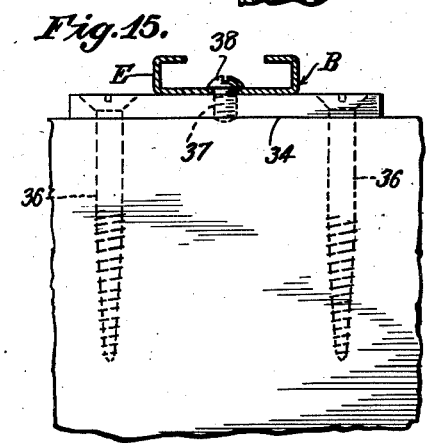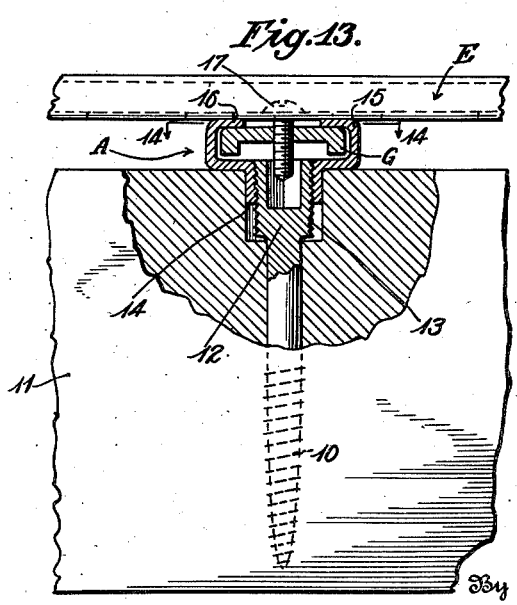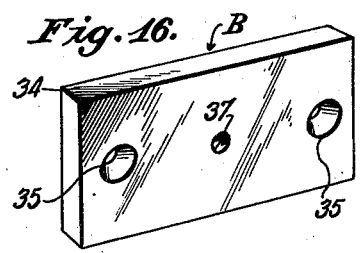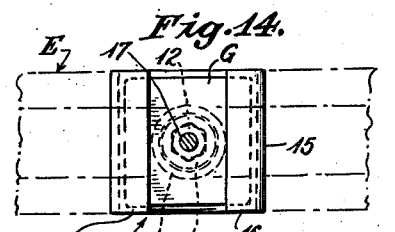
Inventor
Frederick M. Small June 21, 1938.  F. M. SMALL  2,121,213
INTERIOR PANELING
Filed March 29, 1934  9 Sheets-Sheet 6
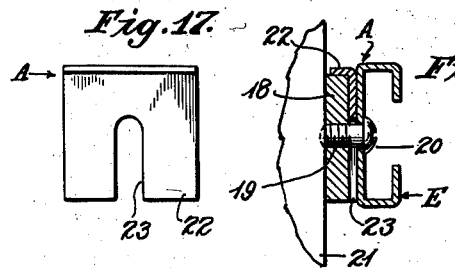
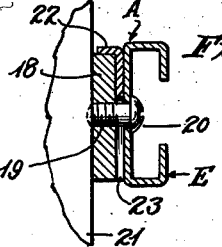
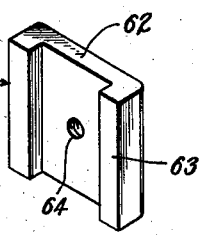
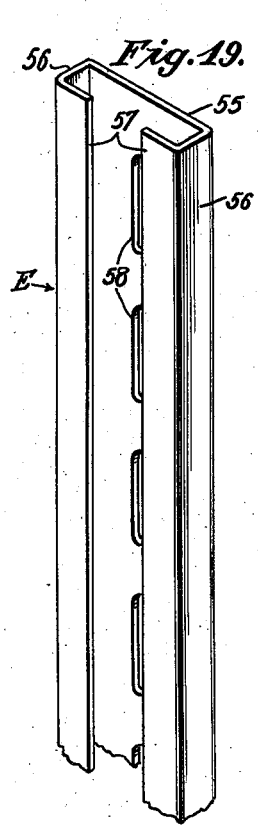
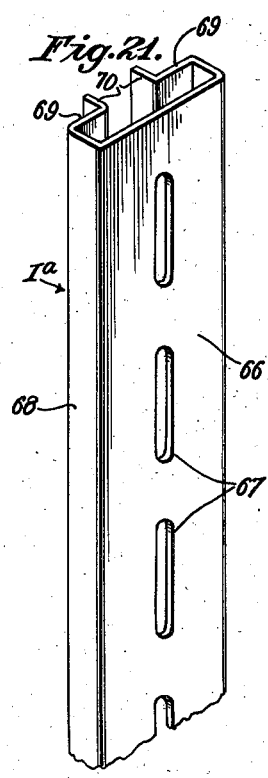
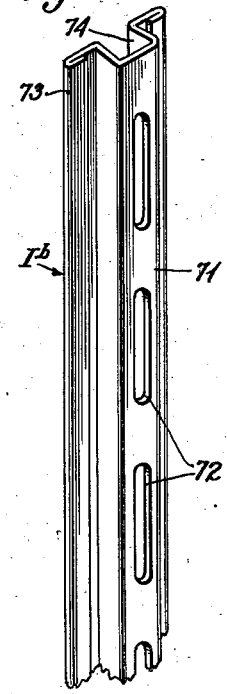
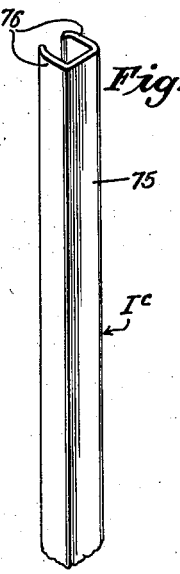
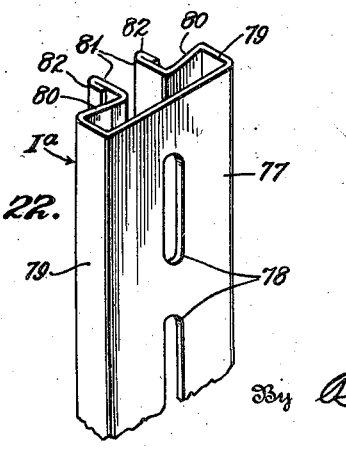
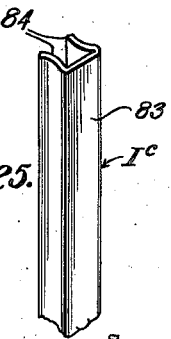
Inventor
Frederick M. Small
By Bacon & Thomas
Attorneys

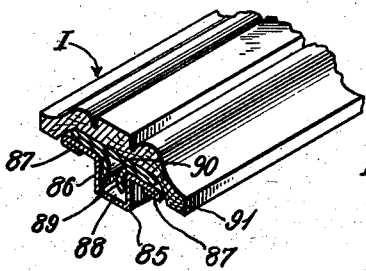
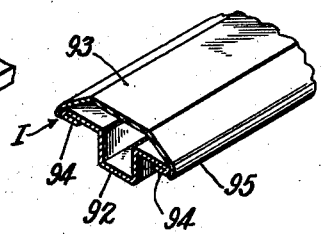
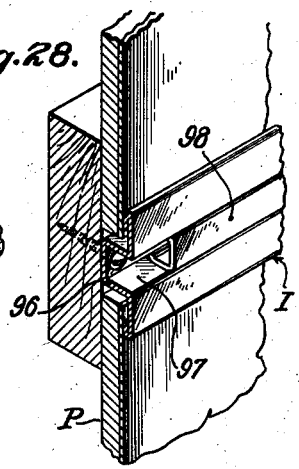
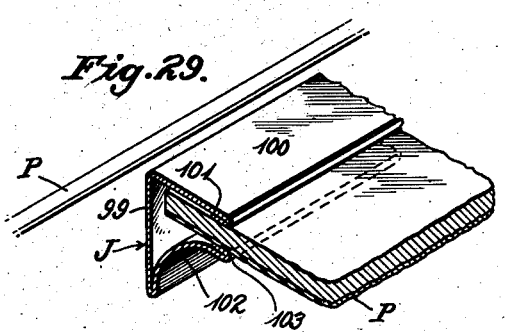
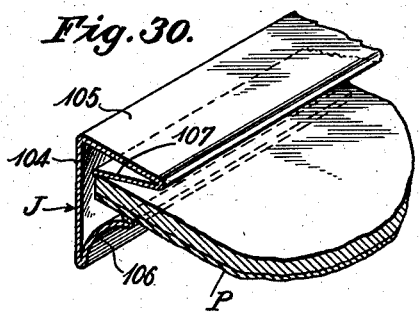
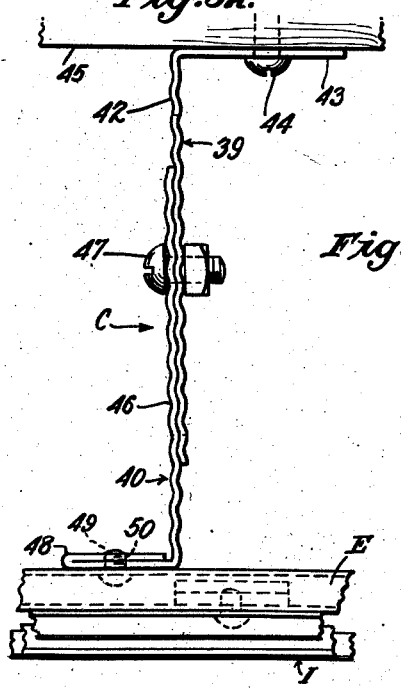
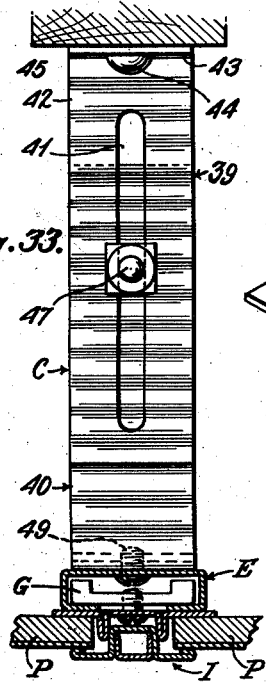
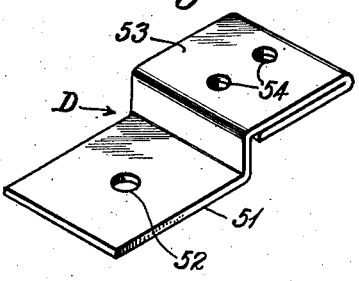

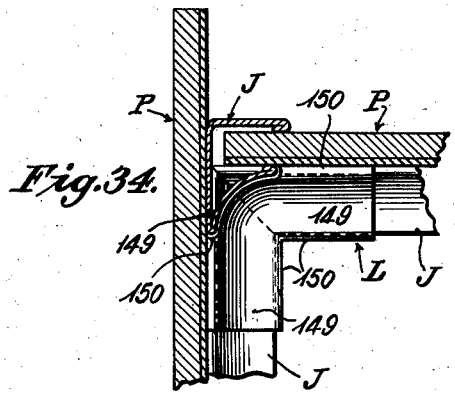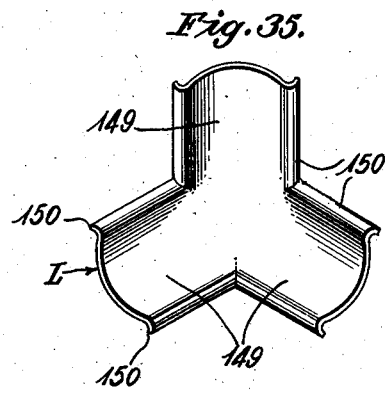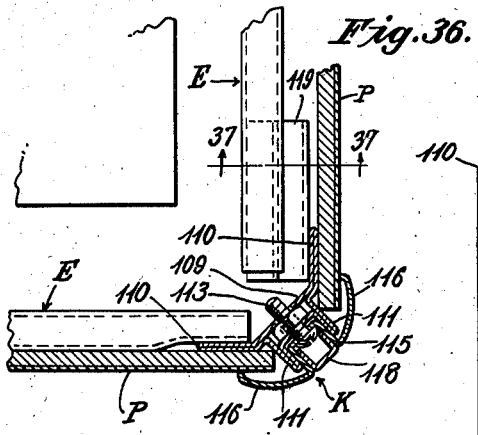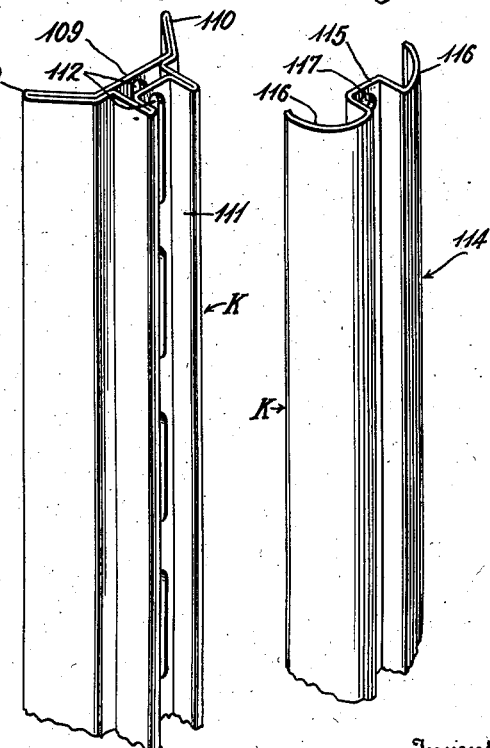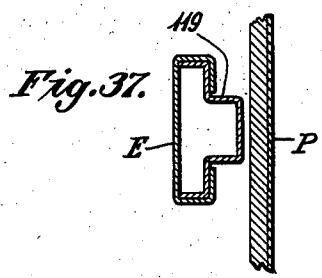

June 21, 1938.   F. M. SMALL   2,121,213
INTERIOR PANELING
Filed March 29, 1934   9 Sheets-Sheet 9
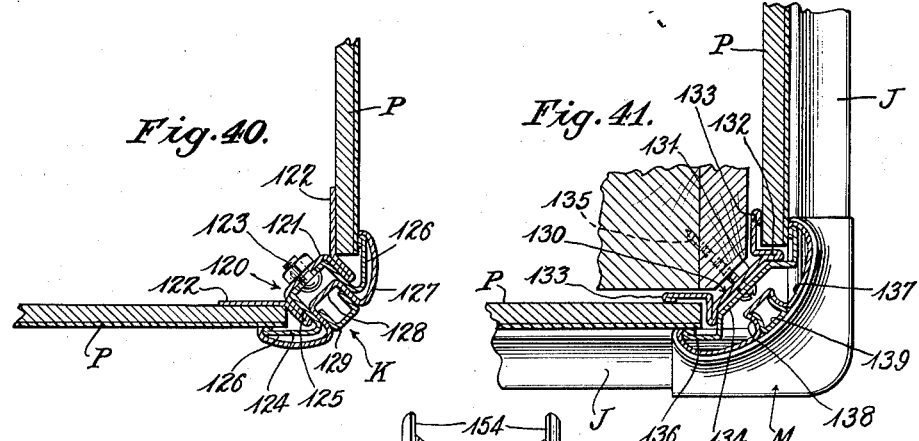
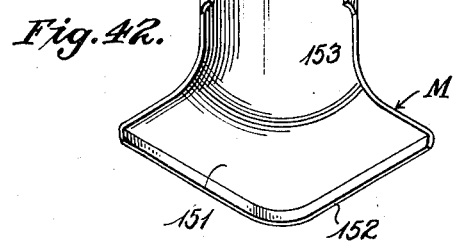
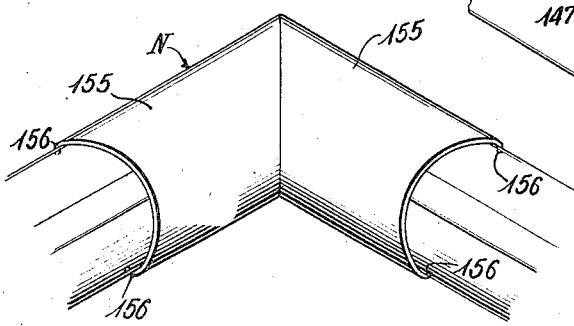
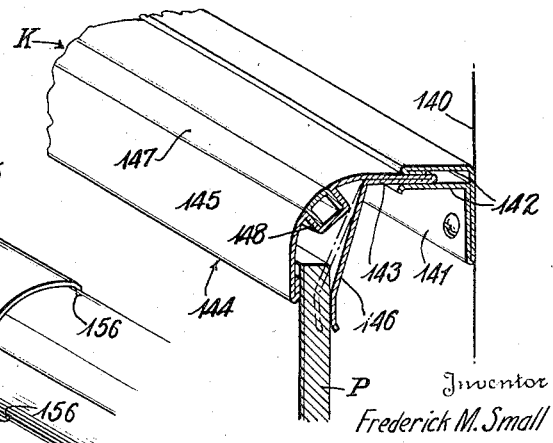
Inventor
Frederick M. Small
By Bacon & Thomas
Attorneys Patented June 21, 1938

2,121,213

UNITED STATES PATENT OFFICE 2,121,213

INTERIOR PANELING

Frederick M. Small, York, Pa., assignor, by mesne assignments, to Martin-Parry Corporation, York, Pa., a corporation of Delaware Application March 29, 1934, Serial No. 718,064

41 Claims. (Cl. 189—85)

This invention relates to new and useful improvements in interior paneling.

The primary object of the invention is to provide a system of paneling which is suitable for use in finishing or refinishing the walls and ceilings of rooms or other enclosures.

A further object of the invention is to provide a system of interior paneling which will include suitable forms of mountings for sheets of panel material by means of which the walls with the various angles arranged therein and ceilings of rooms or other suitable enclosures may be artistically and originally finished or refinished.

A further important object of the invention is to provide suitable devices for securing paneling sheets to the various interior surfaces of a room, or the like, and by means of which the panel sheets may be properly positioned or removed in more or less limited spaces and wherein any desired design or pattern may be followed.

Other objects and advantages of the invention will be apparent during the course of the following description:

In the accompanying drawings forming a part of this specification and in which like numerals are employed to designate like parts throughout the same, Figure 1 is a perspective view of a section of the walls, ceiling, and flooring of a room which has been decorated by means of the paneling embodying this invention, Fig. 2 is a horizontal sectional view taken on line 2—2 of Fig. 3 and illustrates the right hand portion of the wall section disclosed in Fig. 1, Fig. 3 is a vertical sectional view taken on line 3—3 of Fig. 2.

Fig. 4 is a vertical sectional view taken on line 4—4 of Fig. 3,

Fig. 5 is a vertical sectional view taken on line 5—5 of Fig. 3,

Fig. 6 is a detail vertical sectional view taken on line 6—6 of Fig. 3,

Fig. 7 is a detail vertical sectional view taken on line 7—7 of Fig. 3,

Figure 1:
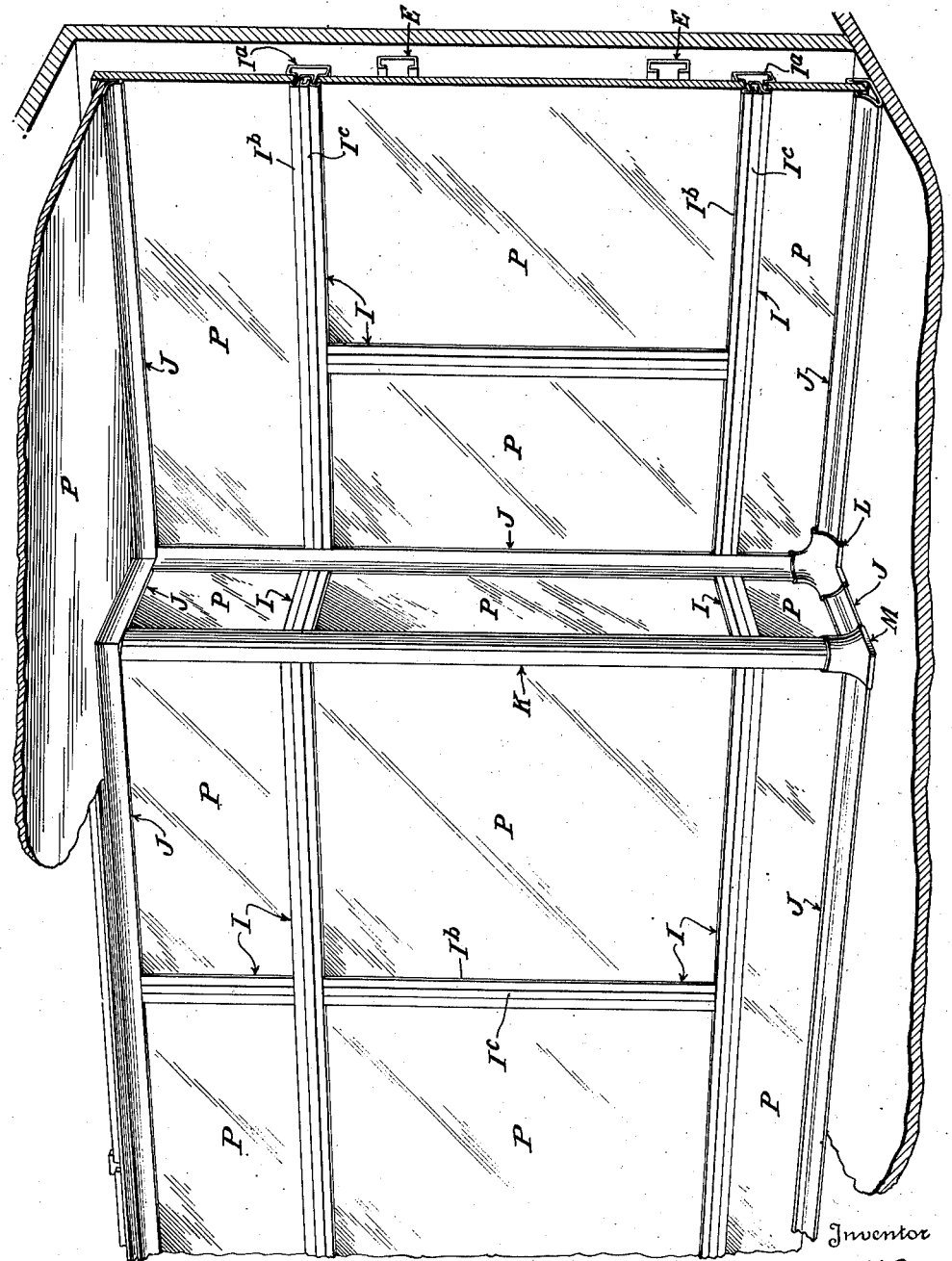
Figure 8:
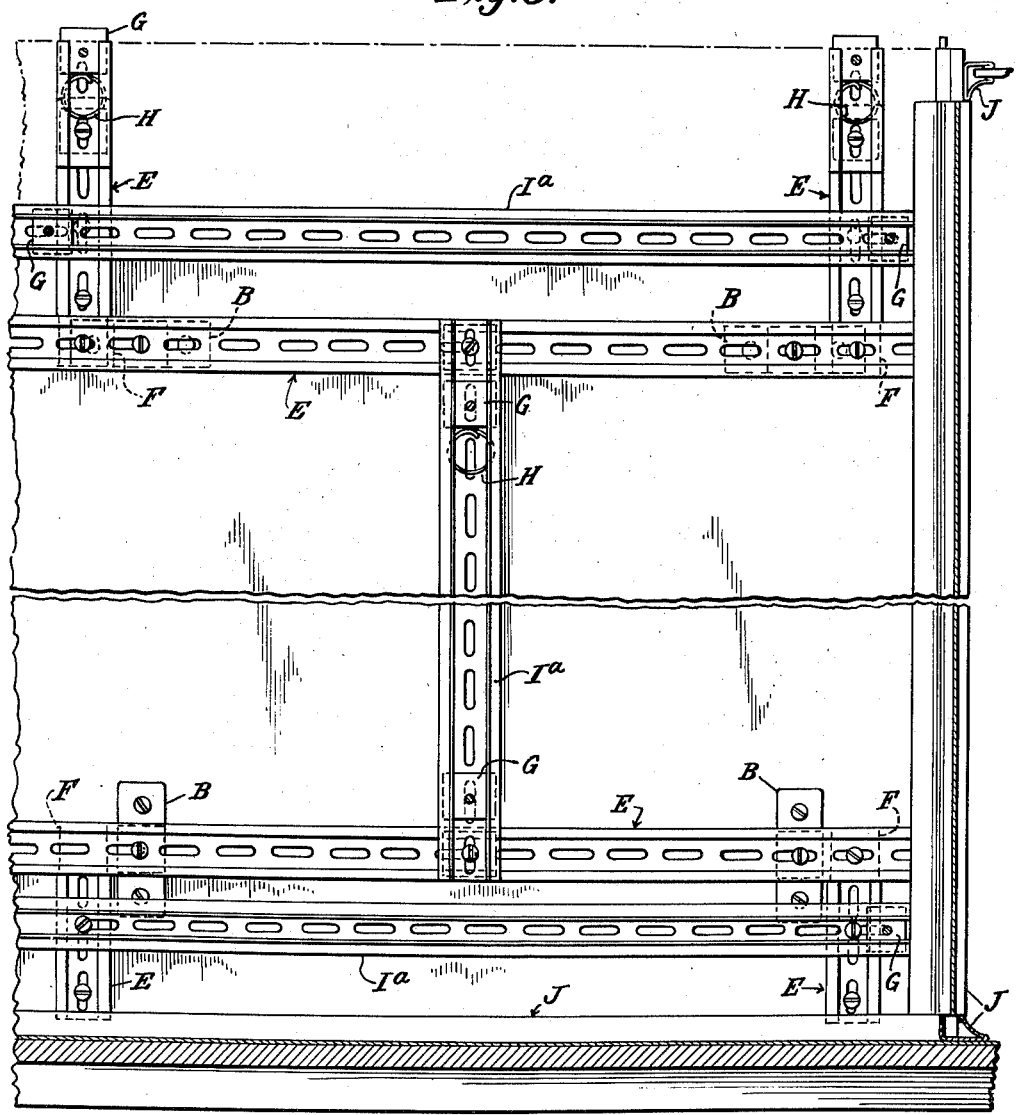
Figure 9:
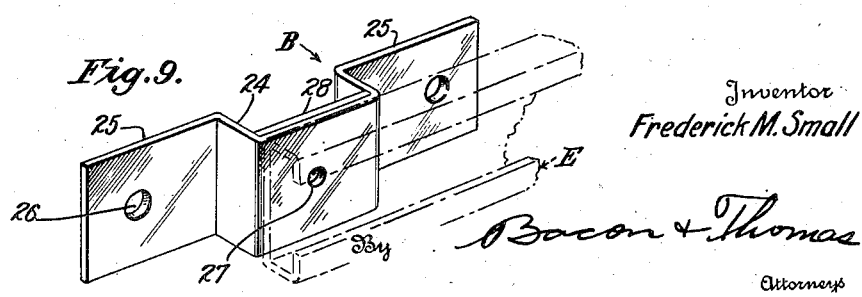

Fig. 8 is a vertical sectional view, similar to Fig. 3, but disclosing the left hand portion of the paneling shown in Fig. 1, Fig. 9 is a detail perspective view of a non-adjustable wall anchor, the use of which will be explained in detail at a later point, Figs. 10, 11 and 12 are detail views of a modified form of non-adjustable wall anchor, Fig. 10 being a plan view, Fig. 11 being a longitudinal sectional view, and Fig. 12 being a sectional view taken on line 12—12 of Fig. 10, Figs. 13 and 14 are detail views of an adjustable form of wall anchor, Fig. 14 being taken on line 14—14 of Fig. 13, Figs. 15 and 16 are detail views of a further form of non-adjustable wall anchor, Figs. 17 and 18 are detail views of a further form of an adjustable wall anchor, Fig. 19 is a detail perspective view of a mounting rail, Fig. 20 is a detail perspective view of a form of anchor plate, Figs. 21 and 22 are perspective views of two different forms of base strips which form a part of mounting moldings for the panel sheets, Fig. 23 is a perspective view of a top strip which constitutes a part of the panel sheet securing molding, Figs. 24 and 25 are perspective views of two different forms of wedging insert strips, adapted to be associated with the top strip disclosed in Fig. 23, Figs. 26, 27 and 28 are perspective views of three different forms of panel moldings, Figs. 29 and 30 are perspective views of moldings suitable for forming inside angles of the paneling, Fig. 31 is a perspective view of a non-adjustable ceiling anchor, Figs. 32 and 33 are side elevational views of an adjustable form of ceiling anchor, Figs. 34 and 35 are detail views of finishing angle plates employed for concealing joints between molding sections, Fig. 36 is a transverse sectional view of a form of molding employed for supporting and connecting the adjacent edges of panel sheets arranged to form an outside angle, Fig. 37 is a detail sectional view taken on line 37—37 of Fig. 36, Figs. 38 and 39 are detail perspective views of the base and top strips respectively, which, when properly associated, form the outside angle molding disclosed in Fig. 36, Fig. 40 is a transverse sectional view of a further modified form of outside angle molding, Fig. 41 is a transverse sectional view of a still further modified form of outside angle molding, the sectional view also disclosing a finishing angle plate employed to conceal joints between molding sections, Fig. 42 is an inside perspective view of the finishing angle plate disclosed in Fig. 41, Fig. 43 is a perspective view of a still further modified form of outside angle molding specifically employed for forming the base board of a room paneling, and Fig. 44 is a detail perspective view of a finishing angle plate employed for concealing joints between molding sections.

This invention first will be briefly described by separately identifying the essential elements which comprise this system of paneling and which are shown in detail in Figs. 9 to 44 inclusive. These elements also will be briefly described with reference to their properly associated positions in the assembly views, Figs. 1 to 8 inclusive. In this brief description where various modifications of an element are illustrated, all of the modifications will be given the same general reference character in all of the figures and it is to be understood that the different forms of a single element may be interchangeably employed, notwithstanding the fact that the assembly views may only disclose one form. The detail description, which will follow this brief description will be relied upon to clearly point out the distinguishing features of each different modification of a single element.

In paneling or finishing the walls and ceilings of newly constructed rooms and the paneling or refinishing of walls and ceilings of old rooms by means of the paneling system embodying this invention, it first becomes necessary to provide means for tying the paneling to the said ceilings and walls. Wall and ceiling anchors have been provided for this purpose. Where the walls and ceilings to be paneled are found to be level, or without material irregularities, no adjustment in the anchor structures need be provided. Where the walls and ceilings are not level, or are provided with irregularities of different sizes, shapes, and characters, the anchor members provide means for taking care of such irregularities. Adjustable wall anchors, generally designated by the reference character A, are shown in detail in Figs. 13, 14, 17 and 18 and are shown assembled in Figs. 2, 3 and 6. Non-adjustable wall anchors, generally designated by the reference character B are shown in detail in Figs. 9 to 12 inclusive, 15 and 16. Adjustable ceiling anchors, designated generally by the reference character C, are shown in detail in Figs. 32 and 33. A form of non-adjustable ceiling anchor, designated by the reference character D, is shown in detail in Fig. 31. It will be noted that these various anchor structures are secured to walls or ceilings by means of screw fasteners. These fastener elements, of course, should be mounted in solid supports, such as studding, or the like. The various anchor members may be arranged at as many different points as are found to be necessary to properly tie the paneling to the surfaces to be ornamented.

After properly positioning the wall and ceiling anchors of desired forms, to accommodate the style and arrangement of paneling desired, mounting rails, designated in general by the reference character E should be secured to the anchors. A detail view of a section of mounting rail is shown in Fig. 19. Assembly views appearing in Figs. 1, 2, 3, 4, 5, 6 and 8 disclose different ways in which the mounting rails may be connected or secured to the wall anchors to accommodate the style and arrangement of paneling desired. It is to be understood that any other desired arrangement of mounting rails may be employed to permit panel sheets of different sizes and shapes than those shown in Fig. 1 to be employed.

It sometimes becomes necessary or advisable to employ short sections of mounting rails in locations where wall or ceiling anchors cannot be advantageously employed. In such cases, splice plates, designated in general by the reference character F may be utilized. Such splice plates, and the ways in which they are used, are shown in the assembly views of Figs. 2, 3, 4 and 8.

It will be noted by inspecting the detail view in Fig. 19 that the mounting rails for the molding are of channel formation. For the purpose of adjustably connecting the moldings to the rails, a form of connector plate, designated by the reference character G, is provided. One of these connector plates is shown in detail in Fig. 20. Figs. 2 to 8 inclusive, disclose these connector plates G arranged as desired in the various mounting rails E to permit the molding strips to be properly connected to the rails. These connector plates G are loosely arranged in the troughs of the mounting rails until they are properly connected to the molding sections. In cases where the mounting rails extend vertically, it becomes necessary to retain the connector plates in the desired locations. To accomplish this result, retaining springs, designated in general by the reference character H, are located in the troughs of the mounting rails just below the proper locations for the connector plate G.

After the connector plates G are properly located in the mounting rails, the desired form of molding is connected to the plates G. These moldings are of three general types. The first type, designated in its entirety by the reference character I is employed for connecting panel sheets to the mounting rails where the interconnected panel sheets are arranged in a common plane. Assembly views of the molding I are shown in Figs. 26, 27 and 28. This type of molding includes a base strip $I^a$ two forms of which are shown in Figs. 21 and 22; a top strip $I^b$ which is disclosed in detail in Fig. 23 and a wedging insert strip $I^c$, two forms of which are shown in detail in Figs. 24 and 25.

The second type of molding is designated generally by the reference character J and is employed for taking care of inside angles formed by the panel sheets to be connected by this type of molding. Inside angle moldings of different types are disclosed in detail in Figs. 29, 30, and 34. Figs. 1, 2, 3, 4, 5 and 8 disclose assembly views which include sections of inside angle moldings.

The third type of molding, which will be designated by the reference character K, is employed to take care of outside angles formed by the paneling sheets interconnected by this type of molding. Figs. 36 to 41 inclusive and 43 disclose in detail various forms of outside angle moldings K. Fig. 1 discloses an outside angle molding K assembled with the remaining elements of the panel.

At numerous points or locations in the paneling of a room, the ends of different molding sections will come together to form a joint. For the purpose of concealing or covering this joint, different forms of finishing angle plates have been provided. Fig. 1 discloses two different forms of such finishing plates. They are designated L and M respectively. The form of finishing plate L is disclosed in detail in Figs. 34 and 35. The form of finishing angle plate designated by the character M is disclosed in detail in Figs. 41 and 42. A third form of finishing angle plate is disclosed in detail in Fig. 44 and is designated by the reference character N. This finishing angle plate N is employed to connect the adjacent ends of outside angle molding sections employed for mounting panel sheet sections to finish off a window or other form of opening.

After properly positioning the wall anchors, connecting the mounting rails to said anchors, and securing the base strips of the moldings to the mounting rails, the panel sheets P of proper sizes and shapes are associated with the base strips of the moldings after which the top strips of the moldings are positioned and suitably connected to the base strips. To complete the assembly of the moldings, the wedging insert strips $I^c$ are then associated with the top strips $I^b$. The paneling of a desired surface is then completed. These panel sheets may be made of any desired material, plastic composition, or the like, and may be of one consistency or character throughout their thickness or they may consist of laminated structures, such as a main base portion with a veneer finishing surface. Figs. 1 to 8, inclusive, 28 to 30, inclusive, 32 to 34, inclusive, 36, 37, 40, 41 and 43 disclose panel sheets properly associated with the various forms of moldings.

It will be determined from a consideration of this system of paneling, as described above, that one of the most outstanding features is the fact that a given wall section may be covered by panel sheets of any desired number of different sizes and shapes whereby many different panel designs and effects may be accomplished. In other words, the sizes and shapes of the various panel sheets need not bear any definite relation to the spacing between the studding members of the wall structure to be finished by the paneling. In all prior art paneling systems I am familiar with, the horizontal dimensions of the panel sheets must bear a definite relation to the spacing between the wall studding members. That is, each panel sheet must have a horizontal dimension which corresponds with the distance between the centers of adjacent studding members or the horizontal dimensions of the various panel sheets must be multiples of the distance between the centers of adjacent panel sheets so that the vertical seams or joints between associated edges of adjacent panel sheets will overlie studding members.

In wall structures where my paneling is secured to studding members, the anchor devices are the only elements which must be arranged in a certain relation with respect to the studding members. The mounting rails and the molding devices, however, have no definite relationship with the studding members and for that reason the seams or joints between adjacent panel sheets may be placed at any desired points throughout the wall area.

A careful study of Figures 2 to 8, inclusive, discloses the fact that the mounting rails E are arranged relative to each other so as to form a base frame which is attached to the supporting wall structure by the anchor devices. This base frame is skeleton-like in character. A second skeleton-like frame is formed by the various molding sections. This second skeleton-like frame is secured to the base frames formed by the mounting rails, so as to overlie the base frame. The second skeleton-like frame, which is formed by the various molding sections, is divided up into a plurality of areas or zones by the respective molding sections. These areas or zones may be of any desired shape or size or may be of a plurality of different shapes or sizes. The various panel sheets, in view of the fact that all of the edges of the same are bounded and defined by the molding sections, will be of the same shapes and sizes as the areas defined by the associated molding sections.

The various elements, designated by the reference characters A to N inclusive now will be described separately with reference to the various detail views, Figs. 9 to 44 inclusive:

Adjustable wall anchors are disclosed in Figs. 13, 14, 17 and 18. The preferred form is shown in Figs. 13 and 14 and includes a wood screw 10 which is adapted to be threaded into a wooden studding 11. The head 12 of the screw is externally screw threaded at 13. An internally screw threaded tubular socket 14 is adapted to be adjustably connected to the head 12. This socket has a substantially square head 15 formed thereon which is of channel formation in cross section to provide inwardly directed flanges 16. After the screw 10 is properly connected to a studding, the channel-shaped head 15 may be adjusted with respect to the screw and its head 13 to vary the position of the channel-shaped head 15 with respect to the surface of the wall to which the anchor is secured. The channel-shaped head 15 is designed to receive a connecting plate G in the manner best illustrated in Fig. 13. The bore of the head 13 of the screw 10 will function to receive the inner end of the screw 17 employed for connecting a rail section E to the adjustable, channel-shaped head 15.

The second form of adjustable wall anchor is shown in Figs. 17 and 18 and consists of a base plate 18 adapted to be secured in any desired manner to a wall surface. This base plate is provided with a threaded aperture 19 for receiving a screw 20 by means of which a rail section E is connected to the base plate. To vary the position of the rail with respect to the wall 21 to which it is to be tied, one or more shims or wedge members 22 may be interposed between the exposed face of the base plate 18 and the bottom face of the rail E. This shim or wedge 22 is provided with a slot 23 to receive the connecting screw 20. It is to be understood that the shim or wedge 22 may be of any desired thickness.

Three different forms of non-adjustable wall anchors B are disclosed in Figs. 9 to 12 inclusive, 15 and 16. The first form is completely illustrated in Fig. 9 and includes an arched main body portion 24 provided with oppositely projecting feet 25. These feet are apertured at 26 to receive securing screws, bolts or the like. The arched body portion 24 has a threaded aperture 27 located in its central portion. Secured to the underside of this central portion is a relatively thin plate 28 which is provided with a threaded aperture registering with the aperture 27. These alined threaded apertures will function as a nut to receive a securing bolt for connecting a rail section E to the anchor. Fig. 9 discloses one way in which a rail section is connected to this non-adjustable anchor or with the rail section extending longitudinally of the anchor. It is to be understood, however, that the rail section may extend at right angles to the anchor, as illustrated in the lower portion of Fig. 8.

The second form of non-adjustable wall anchor is disclosed in Figs. 10 to 12 inclusive. This form includes a lag screw 29 adapted to be threaded into an expansible anchor sleeve 30 for mounting the lag screw in concrete or the like. The lag screw has a suitable angular head 31 at its outer end. An internally threaded bore 32 is formed axially through the head and a portion of the shank. This threaded bore is designed to receive a connecting screw 33 having a conventional washer for backing up the head. The screw 33 is employed for connecting a rail section E to the lag screw 29. As described in connection with the form of non-adjustable wall anchor B illustrated in Fig. 9, the rail section E may extend in any desired angle with respect to the lag screw 29.

A third form of non-adjustable wall anchor B is disclosed in Figs. 15 and 16. This form includes a base plate 34 which has a pair of apertures 35 arranged adjacent its ends. These apertures are provided to receive securing screws 36 by means of which the base plate may be tied to a wall. Centrally, the base plate 34 is provided with a threaded aperture 37 for receiving a connecting screw 38 by means of which a rail section E may be secured to the base plate.

A form of adjustable ceiling anchor is disclosed in detail in Figs. 32 and 33. This ceiling anchor is designed for leveling the paneling secured to the ceiling and includes two L-shaped strap members 39 and 40. The section 39 has its main body portion longitudinally slotted at 41 and formed with transverse corrugations 42. The foot 43 of the strap section is apertured to receive a connecting screw 44 by means of which this strap section 39 may be secured or tied to the ceiling 45. The second strap section 40 is provided with a bolt receiving aperture which registers with the slot 41 in the section 39 and is provided with transversely extending corrugations 46 adapted to mesh or mate with the corrugations 42 of the first mentioned strap section 39. A clamping bolt and nut 47 is arranged within the mating aperture and slot of the two strap sections for connecting the said sections in relative adjusted positions. The mating or meshing corrugations of these two sections, when the screw and nut 47 is tightened in place, will prevent relative elongation of the anchor and will prevent the two strap sections from pivoting with respect to each other. The foot 48 of the second strap section 40 is bent upon itself to provide double thickness of the strap material. Threaded apertures 49, arranged in axial alinement, are provided in both plies of the foot 48 to receive a screw 50 by means of which a rail section E may be connected to the adjustable ceiling anchor. Figs. 32 and 33 disclose the manner in which the rail section is connected to this anchor and the manner in which a molding section I and two panel sheets P will be associated with the rail E.

A non-adjustable ceiling anchor is disclosed in detail in Fig. 31. This ceiling anchor D is formed of a reversely bent strip of strap material having a foot portion 51 provided with an aperture 52 for receiving a screw, or the like, by means of which the anchor D is tied to the ceiling. The remaining end portion 53 of this anchor is formed of two thicknesses or plies of material by having the strap doubled upon itself. Two internally threaded apertures 54 are formed through both plies of this end 53 and are designed to receive screws by means of which a rail section E may be secured to the anchor.

Fig. 19 discloses in detail a relatively short section of the mounting rail E provided for connecting the various forms of moldings to the anchors. This mounting rail is of channel formation and includes a base 55 having two side upstanding flanges 56. These side flanges carry inwardly directed edge flanges 57. The base 55 of the mounting rail is provided with a longitudinal series of elongated slots 58. These slots are designed to receive the connecting screws employed for securing the rail to the various forms of wall and ceiling anchors. Due to the elongation of these slots and the close relation of the various slots of the series, very little care need be taken in originally locating the anchors to which the rail is to be secured.

In addition to the use of different wall and ceiling anchors for mounting the rail sections, the preceding brief description of the invention stated that splice plates F might be employed for connecting short sections of rails to the main or long sections which in turn are tied to the walls or ceilings by the previously described forms of anchors. Figs. 2, 3, 4, and 8, disclose the manner in which splice plates F are used. These splice plates merely consist of an elongated strap-like body 59 with a suitably spaced series of apertures 60 internally screw-threaded to receive connecting screws 61 by means of which rails may be fastened to the splice plate. Fig. 4 discloses the splice plate F most clearly.

The mounting rail E has been described above as being of channel formation. This formation is intended to accommodate a desired number of connector plates G shown in detail in Fig. 20. This connector plate is of U-formation in cross section and includes the back portion 62 having at its edges the longitudinal extending flanges 63. Centrally, the back portion 62 is provided with a threaded aperture 64 adapted to receive a connecting screw for joining molding to the rail.

These connector plates G are loosely positioned within the rails E until molding sections are tightly connected to the plates G. This tightening up of the connector screws will retain the connector plates G against movement with respect to their associated rails. Where the mounting rails E extend vertically, means must be provided for retaining the connector plates G in their desired positions to properly register with the moldings to be secured to the connector plates. In Figs. 3, 4, 5 and 8 there has been disclosed a connector plate retaining spring structure H. Figs. 4 and 8 disclose these springs most clearly. They merely consist of a wire strand 65 bent to form any desired number of convolutions. In the preferred form, slightly more than one convolution is provided so that the free ends will overlap each other. The diameter of the spring convolutions is greater than the transverse width of the trough formed by the channel-shaped mounting rail so that when the retaining springs are located within the troughs of the rails, the convolutions of the springs will be reduced in diameter to retain the springs under compression. This compressing of the springs will cause the same to be frictionally held in their desired positions, the springs are intended to be located beneath the connector plates G to hold these plates properly positioned with respect to the length of their associated rails.

Different forms of moldings I are disclosed in Figs. 21 to 28 inclusive. This type of molding is intended to be employed for securing panel sheets to mounting rails tied to walls or ceilings and are not designed to take care of angles.

The separate elements which cooperate to form one molding structure I are disclosed in detail in Figs. 21, 23 and 24. These elements consist of the base strip I$^a$, the top strip I$^b$ and the wedging insert strip I$^c$. The base strip I$^a$ is of channel formation and includes a bottom 66 having formed therein a longitudinal series of elongated slots 67. This bottom 66 is provided at its longitudinal edges with upstanding side flanges 68 carrying at their free edges inwardly bent top flanges 69. The opposed inner edges of these top flanges are provided with upstanding edge flanges 70 arranged in parallelism with respect to each other. It has been stated above that the connector plates G, shown in detail in Fig. 20, are arranged in the mounting rails E for connecting the molding sections to the rails. The screws to be threaded into the apertures 64 of the connector plates pass through the elongated slots 67 of the base strip I$^a$ of the molding. The top strip I$^b$, disclosed in Fig. 23, is to be connected to the base strip I$^a$ to extend longitudinally thereof. This top strip I$^b$ is formed with a substantially U-shaped main body portion 71 having a longitudinal series of elongated slots 72 formed therein. This substantially U-shaped body portion 71 is intended to be received between the parallel edge flanges 70 of the base strip I$^a$. To connect the top strip I$^b$ to the base strip, a suitable number of connector plates G are located within the trough of the channel-shaped base strip. Screws threaded into the apertures 64 of the connector plates G and passed through the elongated slots 72 of the top strip will connect the base and top strips in the manner intended. The free longitudinal edges of the side walls of the U-shaped body portion 71 of the top strip I$^b$ have laterally projecting flanges 73. Fig. 7 discloses in section the manner in which these base and top strips are associated with respect to each other. It will be noted from this assembly view that the edge flanges 73 of the top strip will overlie the flanges 69 of the base strip and these two flanges 73 and 69 will be arranged substantially in parallelism with respect to each other to receive the adjacent edges of two panel sheets between these parallel flanges. The trough 74 formed by the body portion 71 faces outwardly of the molding and is adapted to have forced therein the wedging insert strip I$^c$ disclosed in Fig. 24. This wedging insert strip is of substantially U-shape in cross section and includes the top 75 and the two side flanges 76. These side flanges are arranged substantially in parallelism with each other and have their longitudinal edges slightly bent inwardly to facilitate insertion of the insert strip into the trough 74 of the top strip. The width of the insert strip is intended to be slightly greater than the width of the trough 74 so that when this insert strip is forced into the trough, the sides of the body portion 71 of the top strip will be spread slightly away from each other. This spreading of the sides of the body portion 71 will cause the edge flanges 73 to be forced tightly against the outer faces of the panel sheets P, as shown in Fig. 7, for clamping these panel sheets in place.

Fig. 22 discloses a slightly modified form of base strip I$^a$. This modification includes the bottom 77 having a longitudinal series of elongated slots 78 formed therein. Side flanges 79 are connected to the longitudinal edges of the bottom 77 and these side flanges carry inwardly directed top flanges 80 having the parallel flanges 81 carried by their inner edges. It will be noted that the top flanges 80 do not extend truly in parallelism with the plane of the bottom 77 but are bent slightly rearwardly toward the bottom. The free edges of the parallel flanges 81 also are bent inwardly upon themselves to provide strengthening beads 82. This form of base strip I$^a$ functions in substantially the same manner as the previously described base strip disclosed in Fig. 21.

A modified form of wedging insert strip I$^c$ is disclosed in Fig. 25. This insert strip includes the top portion 83 with the laterally inwardly bowed side flanges 84. The bowing of these side flanges is intended to cause the wedging strip to be more securely locked in the trough 74 of the top strip I$^b$.

Figs. 26 to 28 inclusive disclose forms of moldings which are employed for clamping panel sheets to mounting rails. Fig. 28 also discloses the fact that these types of moldings may be employed for clamping panel sheets directly to a wooden foundation or supporting surface. The form shown in Fig. 26 includes a top strip 85 formed with side flanges 86 having laterally outwardly projecting edge flanges 87. The base and side flanges of this top strip 85 form a trough 88 which is adapted to receive the bowed flanges 89 of a wedging insert strip which further includes the top 90. Secured to this top is an ornamented covering 91. By securing the base 88 directly to a mounting rail or to a wooden foundation, as illustrated in Fig. 28, the molding may be employed for clamping panel sheets to the supporting surface.

Fig. 27 consists of a top strip 92 which corresponds with the top strip 85 of the molding disclosed in Fig. 26. Instead of employing a wedging insert strip for this top strip, an ornamented cover or cap 93 is snapped over the longitudinal edges 94 of the top strip 92. This snap action is made possible by providing the cover 93 with inwardly bent longitudinal edges 95.

The form of molding shown in Fig. 28 includes a top strip 96 of the same type disclosed in Figs. 26 and 27. The trough 97 formed in this top strip is designed to receive a wedging insert strip 98 of the type disclosed in Figs. 24 and 25.

Figs. 29 and 30 disclose two different forms of inside angle moldings. These moldings are intended to connect panel sheets arranged with respect to each other to form an angle less than 180° when considered from the inside of the room being paneled. Such molding takes care of the angle between the side walls and the floor and ceiling.

The inside angle molding J disclosed in Fig. 29 is intended to be formed from strip material to provide a base 99. One longitudinal edge of this base is formed with a perpendicular flange 100 having a beaded longitudinal edge 101. The remaining longitudinal edge of the base 99 is provided with an inwardly bowed spring flange 102 having a beaded longitudinal edge 103. The base 99 is intended to be secured by screws or the like to either a side wall panel sheet P or any other form of mounting. The two flanges 100 and 102 are intended to clamp between the beaded edges 101 and 103 a ceiling panel sheet. Due to the bowed, springy nature of the flange 102, the ceiling panel sheet P will be clamped securely between the two flanges.

The inside angle molding disclosed in Fig. 30 includes a base 104, adapted to be secured to a support, such as a panel sheet, in the manner illustrated in Fig. 29. The opposite longitudinal edges of this base 104 are provided respectively with the perpendicular flange 105 and the inwardly bowed flange 106. This form of inside molding differs from the form shown in Fig. 29 by having the perpendicular flange 105 provided with an inwardly directed, angularly arranged flange 107. The normal angle between the inwardly directed flange 107 and the perpendicular flange 105 is such that when the panel sheet P is forced between the flanges 106 and 107, the angle of the flange 107 will be reduced. In other words, the flange 107 will be forced toward the perpendicular flange 105 to place the flange 107 under compression. This compressing of the flange 107, by the insertion of a panel sheet P, will cause the flanges 106 and 107 to tightly clamp the panel sheet.

Different forms of outside angle moldings K are disclosed in detail in Figs. 36 to 41, inclusive, and 43. The first form is disclosed in Figs. 36 to 39, inclusive. The base strip, which is shown in detail in Figure 38 is formed from a single blank of sheet material bent to provide the bottom 109 with the double ply edge flanges 110. These edge flanges are adapted to be arranged with respect to each other to correspond with the angle of the wall surfaces with which this molding is associated. In other words, if the wall surfaces which form the angle to be covered by the paneling are arranged at a 90° angle with respect to each other, these edge flanges 110 should be arranged at the same angle. Any variations in the angle formed by the wall surfaces may be taken care of by varying the angle formed by the flanges 110. The material of the blank employed for forming the base strip is further shaped to provide a substantially U-shaped trough or top channel 111. This trough or top channel 111 overlies the base 109 and these two portions 109 and 111 are provided with registering longitudinally arranged slots 112 designed to receive the securing screws 113, shown in Fig. 36. These screws function to connect the top strip 114 disclosed in detail in Fig. 39. This top strip 114 is provided with a channel-shaped main body portion 115 and two laterally projecting, bowed side flanges 116. The base or bottom of the trough-shaped body portion 115 is provided with apertures 117 to receive the securing bolts 113. Fig. 36 discloses two panel sheets P clamped between the flanges 110 and 116 of the base and top strips 108 and 114 respectively. To increase the clamping action of these cooperating flanges, a wedging insert strip 118 is positioned within the trough of the channel-shaped body portion 115.

Fig. 36 discloses the manner in which this outside molding K is arranged to support the two panel sheets. This figure also discloses mounting rails E connected to the two wall surfaces which cooperate to form the angle taken care of by this outside molding. Fig. 37 discloses a type of block 119 which is fitted into the trough of a rail E to provide a bearing surface against which one of the flanges 110 of the base strip 108 bears.

Fig. 40 discloses a modified form of outside angle molding which differs in certain respects from the form shown in Figs. 36 to 39 inclusive. In this modified form of molding, a base strip 120 is provided and is formed of a single blank of material bent to provide a main body portion 121 of substantially U-shape. The side walls or flanges of this main body are bent upon themselves to produce walls of double thickness. Edge flanges 122 are connected to these side walls. The edge flanges 122 are intended to be arranged at an angle with respect to each other which corresponds with the angle formed by the corner to be covered by this panel molding. Secured to the main body portion 121, by a suitable number of screws and nuts 123 is an intermediate clamping strip 124. This clamping strip includes a substantially U-shaped main body portion 125, adapted to be received within the body portion 121 of the base strip, and angularly arranged edge flanges 126 adapted to lie in parallelism with the edge flanges 122 of the base strip. These cooperating flanges 122 and 126 are intended to clamp the adjacent edges of panel sheets P to support said sheets. A cap strip 127 is adapted to be snapped over the edge flanges 126 of the intermediate strip in the manner illustrated. The central portion of this cap is of U-formation to provide a trough 128 adapted to receive a wedging insert strip 129.

A further modified form of outside angle molding is shown in Fig. 41. This molding includes a base strip 130 including a main body portion 131 having side walls 132 and edge flanges 133. An intermediate strip 134 is secured to the base strip and the base strip in turn secured to the wall structure by means of a plurality of screws 135. This intermediate clamping strip is formed with flanges 136 adapted to lie in parallelism with the flanges 133 of the base strip. These cooperating flanges 133 and 136 function to clamp and support the panel sheets P. To finish off this outside angle molding, a cap 137 is snapped over the flanges 136 of the intermediate clamping strip. This cap is provided with a central groove 138 which receives the wedging insert strip 139.

In Fig. 43 there is disclosed an outside angle molding structure which is adapted for use to provide a base board appearance in a paneled room. The wall 140 of the room has secured thereto a base strip 141 which is formed of a strip of sheet metal bent to provide the parallel flanges 142. Inserted between these flanges 142 is the doubled-over edge 143 of the top molding strip 144. This top molding strip is formed of double thickness to provide the arched top portion 145 and the resilient inner portion 146. The free longitudinal edges of these two portions 145 and 146 are intended to clamp a panel sheet P therebetween. A wedging insert strip 147 is positioned within a groove 148 formed in the top portion 145. This wedging strip 147 tensions the top portion 145 transversely to cause the same to more securely bear against the panel sheet P. This panel sheet, when properly positioned, springs the underneath portion 146 out of its normal position to place tension upon the same for further aiding in clamping the panel sheet.

In many places in a paneled room, a plurality of ends of inside and outside angle molding sections will come together to form a seam or joint. It, therefore, is desirable to conceal such joints and finishing angle plates are employed for that purpose.

In Figs. 34 and 35, a finishing angle plate L is illustrated. This angle plate is designed for concealing the joints between three different inside angle moldings. Such a joint of inside angle moldings will be found at the ceiling and floor of every inside angle formed in a room. This finishing angle plate is provided with the three branches 149 adapted to overlie the three respective sections of the inside angle molding. Both side edges of each branch 149 are provided with hook-shaped beads 150 which will snap over the edges of the inside angle moldings, as illustrated in Fig. 34.

Figs. 41 and 42 disclose a finishing angle plate M which is intended to conceal the joint between two inside angle molding sections J and one outside angle molding section. Such a joint will be found at the floor and ceiling of every outside angle formed in the wall of a room. This finishing angle plate M includes the substantially triangularly shaped foot portion 151, adapted to overlie the two sections of inside angle molding. An edge flange 152 is provided for this foot portion 151 to engage the outer edges of the moldings J. The foot portion carries an upstanding part 153 which is adapted to overlie the outside angle molding section, as illustrated in Fig. 41. The edges of this upstanding portion 153 are provided with hook-shaped flanges 154. These flanges are intended to snap over the edges of the cap 137, see Fig. 41.

Fig. 44 discloses a finishing angle plate adapted to conceal the joint formed between two outside molding sections, which joint will occur at the corners of a window opening where the window frame is offset outwardly with reference to the inner face of the wall. This finished angle plate N includes the two branches 155 which are arranged at right-angles with respect to each other. These branches are bowed or curved in transverse section. The longitudinal edges 156 of each branch are curled inwardly to permit the same to be snapped over the edges of the molding sections.

It is believed that the above brief description and detailed description of the various elements which are cooperatively associated to form this novel paneling system will be sufficient to enable anyone skilled in the art to properly understand the manner in which the various elements are employed to cause the same to perform their intended functions. Further explanation of the mode of operation, therefore, is deemed to be unnecessary.

It is to be understood that the forms of this invention herewith shown and described are to be taken as preferred examples of the same and the various changes in the shape, size, and arrangement of parts may be resorted to without departing from the spirit of the invention and the scope of the subjoined claims.

Having thus described the invention, I claim:

1. Interior paneling of the type described comprising, the combination with the surface to be covered, of rigid anchor devices secured to the surface, mounting rails connected to the anchor devices and some of which are angularly arranged relative to others, multi-part molding sections connected to the mounting rails, and panel sheets immovably supported at their edges between the parts of the molding sections.

2. Interior paneling of the type described comprising, the combination with the surface to be covered, of anchor devices secured to the surface and adjustable to accomplish leveling of the paneling, mounting rails connected to the anchor devices, molding sections connected to the mounting rails, and panel sheets supported at their edges by the molding sections.

3. Interior paneling of the type described comprising, the combination with the surface to be covered, of anchor devices secured to the surface, mounting rails, means for connecting the mounting rails in different operative positions to anchor devices, molding sections connected to the mounting rails, and panel sheets supported at their edges by the molding sections.

4. Interior paneling of the type described comprising, the combination with the surface to be covered, of anchor devices secured to the surface, mounting rails connected to the anchor devices, molding sections connected in different positions of adjustment to the mounting rails, and panel sheets supported at their edges by the molding sections.

5. Interior paneling of the type described comprising, the combination with the surface to be covered, of adjustable anchor devices secured to the surface, mounting rails connected to the anchor devices in any one of a plurality of operative positions, molding sections connected to the mounting rails for adjustment longitudinally of the rails, and panel sheets supported at their edges by the molding sections.

6. Interior paneling of the type described comprising, the combination with the surface to be covered, of mounting rails adapted to be arranged in parallel rows overlying said surface, a plurality of anchor devices secured to the surface at suitably spaced places to support the mounting rails, molding devices adapted to be arranged in parallel rows overlying and extending substantially at right angles to the mounting rails, means for connecting the molding devices to the mounting rails, and panel sheets supported and bounded by the molding devices.

7. Interior paneling of the type described comprising, the combination with the surface to be covered, of mounting rails adapted to be arranged in parallel rows overlying said surface, a plurality of anchor devices secured to the surface at suitably spaced points to support the mounting rails, said anchor devices being independently adjustable for leveling the mounting rails, molding devices adapted to be arranged in parallel rows overlying and extending substantially at right angles to the mounting rails, means for connecting the molding devices to the mounting rails, and panel sheets supported and bounded by the molding devices.

8. Interior paneling of the type described comprising, the combination with the surface to be covered, of mounting rails adapted to be arranged in parallel rows overlying said surface, a plurality of anchor devices secured to the surface at suitably spaced points to support the mounting rails, molding devices adapted to be arranged in parallel rows overlying and extending substantially at right angles to the mounting rails, each section of molding being formed of a plurality of separably connected strips, means for connecting the molding devices to the mounting rails, and panel sheets clamped between certain ones of the molding strips at all edges of the sheets so as to conceal and bind said edges.

9. Interior paneling of the type described comprising, the combination with the surface to be covered, of mounting rails adapted to be arranged in parallel rows overlying said surface, a plurality of anchor devices secured to the surface at suitably spaced points to support the mounting rails, molding devices adapted to be arranged in parallel rows overlying and extending substantially at right angles to the mounting rail, means for connecting the molding devices to the mounting rails to permit adjustment of the molding devices relative to the mounting rails, and panel sheets supported and bounded by the molding devices.

10. Interior paneling of the type described comprising, the combination with the surface to be covered, of mounting rails adapted to be arranged in parallel rows overlying said surface, a plurality of anchor devices secured to the surface at suitably spaced points to support the mounting rails, said anchor devices being independently adjustable for leveling the mounting rails, molding devices adapted to be arranged in parallel rows overlying and extending substantially at right angles to the mounting rails, each section of molding being formed of a plurality of separably connected strips, means for connecting the molding devices to the mounting rails, and panel sheets clamped between certain ones of the molding strips at all edges of said sheets so as to conceal and bind said edges.

11. Interior paneling of the type described comprising, the combination with the surface to be covered, of mounting rails adapted to be arranged in parallel rows overlying said surface, a plurality of anchor devices secured to the surface at suitably spaced points to support the mounting rails, said anchor devices being independently adjustable for leveling the mounting rails, molding devices adapted to be arranged in parallel rows overlying and extending substantially at right angles to the mounting rails, means for connecting the molding devices to the mounting rails to permit adjustment of the molding devices relative to the mounting rails, and panel sheets supported and bounded by the molding devices.

12. Interior paneling of the type described comprising, the combination with the surface to be covered, of mounting rails adapted to be arranged in parallel rows overlying said surface, a plurality of anchor devices secured to the surface at suitably spaced points to support the mounting rails, molding devices adapted to be arranged in parallel rows overlying and extending substantially at right angles to the mounting rails, each section of molding being formed of a plurality of separably connected strips, means for connecting the molding devices to the mounting rails to permit adjustment of the molding devices relative to the mounting rails, and panel sheets clamped between certain ones of the molding strips at all edges of the sheets so as to conceal and bind said edges.

13. Interior paneling of the type described comprising, the combination with the surface to be covered, of mounting rails adapted to be arranged in parallel rows overlying said surface, a plurality of anchor devices secured to the surface at suitably spaced points to support the mounting rails, said anchor devices being independently adjustable for leveling the mounting rails, molding devices adapted to be arranged in parallel rows overlying and extending substantially at right angles to the mounting rails, each section of molding being formed of a plurality of separably connected strips, means for connecting the molding devices to the mounting rails to permit adjustment of the molding devices relative to the rails, and panel sheets clamped between certain ones of the molding strips at all edges of the sheets so as to conceal and bind said edges.

14. Interior paneling of the type described comprising, the combination with the surface to be covered, of anchor devices secured to the surface and adjustable to level the paneling, mounting rails longitudinally adjustably connected to the anchor devices, molding sections connected to the mounting rails, and panel sheets supported at their edges by the molding sections.

15. Interior paneling of the type described comprising, the combination with the surface to be covered, of anchor devices secured to the surface, mounting rails longitudinally adjustably connected to the anchor devices, molding sections laterally adjustably connected to the mounting rails, and panel sheets supported at their edges by the molding sections.

16. Interior paneling of the type described comprising, the combination with the surface to be covered, of anchor devices secured to the surface and adjustable to level the panel, mounting rails connected to the anchor devices, molding sections laterally adjustably connected to the mounting rails, and panel sheets supported at their edges by the molding sections.

17. Interior paneling of the type described comprising, the combination with the surface to be covered, of a plurality of anchor devices secured at suitably spaced intervals to the surface, vertically extending mounting rails of channel formation connected to the anchor devices, a plurality of connector plates loosely postioned within the channels of the mounting rails, means adapted to frictionally engage the walls of the channeled mounting rails to retain the connector plates in desired positions of adjustment, molding sections connected to the mounting rails to extend substantially at right angles to said rails, and panel sheets supported at their edges by the molding sections.

18. Paneling of the type described, comprising supporting means, anchor devices secured to the supporting means, mounting members connected to the anchor devices, panel sheets, and means connected to the mounting members for engaging the opposite faces of the panel sheets at all of their edges to clamp and immovably support the latter.

19. Paneling of the type described comprising supporting means, anchor devices secured to the supporting means, a plurality of mounting members supported by the anchor devices, a plurality of panel sheets, and multi-part molding sections connected to the mounting members and clamping all of the edge portions of the panel sheets to immovably support the latter.

20. Wall paneling comprising, the combination with a supporting wall structure, of a predetermined number of panel sheets cut into a plurality of non-uniform sizes, the total area of all of said sheets being substantially equal to the area of the supporting wall structure and when properly assembled will form a complete paneling surface for said wall structure, means for connecting together all of the associated edges of adjacent panel sheets, and means for securing the aforementioned means to the supporting wall structure for fastening said panel sheets to said structure.

21. Wall paneling comprising, the combination with a supporting wall structure, of a predetermined number of panel sheets cut into a plurality of non-uniform sizes, the total area of all of said sheets being substantially equal to the area of the supporting wall structure and which when properly assembled will form a complete paneling surface for said structure, multi-part molding sections clamped to all of the edges of said panel sheets to bind said edges and to connect together associated edges of adjacent panel sheets, and means for securing the molding sections to said supporting wall structure.

22. Wall paneling comprising, the combination with a supporting wall structure, of a predetermined number of panel sheets cut into a plurality of non-uniform sizes, the total area of all of said sheets being substantially equal to the area of the supporting wall structure and which when properly assembled will form a complete paneling surface for said structure, means for connecting together and concealing all of the associated edges of adjacent panel sheets, mounting rails to which the aforesaid means are angularly arranged and adjustably connected, and anchor devices for securing the mounting rails to said supporting wall structure.

23. Wall paneling comprising, the combination with a supporting wall structure, of a predetermined number of panel sheets cut into a plurality of non-uniform sizes, the total area of all of said sheets being substantially equal to the area of the supporting wall structure and which when properly assembled will form a complete paneling surface for said structure, multipart molding sections secured to all of the edges of the panel sheets to bind said edges and to connect together associated edges of adjacent panel sheets, mounting elements to which the molding sections are angularly arranged and adjustably connected, and anchor devices for securing the mounting elements to said supporting wall structure.

24. Wall paneling comprising, the combination with a supporting wall structure, of a predetermined number of panel sheets cut into a plurality of non-uniform sizes, the total area of all of said sheets being substantially equal to the area of the supporting wall structure and which when properly assembled will form a complete paneling surface for said structure, multipart molding sections secured to all of the edges of the panel sheets to bind said edges and to connect together associated edges of adjacent panel sheets, mounting rails to which the aforesaid molding sections are angularly arranged and adjustably connected, and anchor devices for securing the mounting rails to said supporting wall structure.

25. Wall paneling comprising, the combination with a supporting wall structure, of a base frame formed of a plurality of properly associated mounting rails, means for tying the base frame to the supporting wall structure, a plurality of molding base strip sections fastened to the base frame in a manner to bound and define a plurality of areas of predetermined, non-uniform shapes and sizes, a plurality of panel sheets equal in number to the number of areas and preformed to provide one panel sheet of the same shape and size as each of said areas, said panel sheets being arranged in their respective areas in engagement with the molding base strips, molding top strip sections secured to the molding base strip sections to overlie the same and to retain in place said panel sheets, means for connecting the molding base and top strip sections, and means for concealing from view the said connecting means.

26. Wall paneling comprising, the combination with a supporting wall structure, of a base frame formed of a plurality of properly associated mounting rail sections, means for tying the base frame to the supporting wall structure, a plurality of preformed panel sheets of desired shapes and sizes, the total area of all of said sheets being substantially equal to the area of the supporting wall structure and which when properly assembled form a complete paneling surface for said structure, and multi-part molding sections secured to the base frame and arranged to receive between the parts of the same all of the edges of the panel sheets and to rigidly support the said sheets out of contact with the said base frame.

27. Wall paneling comprising, the combination with a supporting wall structure, of a skeleton base frame, means for tying the base frame to the said wall structure so as to overlie the latter, a second skeleton frame, means for fastening the second frame to the base frame so as to overlie the latter with the various superimposed rib-like portions of the respective skeleton frames extending transversely of each other, and a plurality of panel sheets supported by the second skeleton frame.

28. Wall paneling comprising, the combination with a supporting wall structure, of a skeleton base frame, means for tying the base frame to the said wall structure so as to overlie the latter, a second skeleton frame, means for fastening the second frame to the base frame so as to overlie the latter with the various superimposed rib-like portions of the respective skeleton frames extending transversely of each other, all portions of said second skeleton frame being formed of separable parts, and a plurality of panel sheets supported by the second skeleton frame and having their edges clamped between the separate parts of said second frame.

29. Supporting means for wall paneling sheets comprising a base frame formed of mounting rail sections, multipart molding sections, and means for securing the molding sections to the base frame with the molding sections arranged transversely of the mounting rail sections to which they are directly secured.

30. Wall paneling comprising, the combination with a wall studding member, of anchor devices connected to the studding members, a base frame formed of mounting rails attached to the anchor devices, multi-part molding sections secured to the mounting rails to extend at right angles thereto, and panel sheets received at their edges between the parts of the molding sections.

31. Wall paneling comprising, the combination with the wall studding members, of independently adjustable anchor devices connected to the studding members, a base frame formed of mounting rails attached to the anchor devices, said base frame being rendered level and plumb by proper adjustment of the anchor devices, multi-part molding sections secured to the mounting rails, and panel sheets received at their edges between the parts of the molding sections.

32. Wall paneling comprising, the combination with a supporting wall structure, of panel units, an inner molding strip, a separable outer molding strip, said molding strips receiving adjacent edges of panel units, a fastening element operable exteriorly of said outer molding strip for drawing together or separating the molding strips whereby to permit assembly or disassembly of the panel units, a concealing strip of resilient character snapped into engagement with the outer molding strip for concealing said fastening element and adapted to be removed therefrom without disturbing the operative relationship of